United States Patent
Zhu et al.

(10) Patent No.: US 9,411,622 B2
(45) Date of Patent: Aug. 9, 2016

(54) PERFORMANCE-DRIVEN RESOURCE MANAGEMENT IN A DISTRIBUTED COMPUTER SYSTEM

(71) Applicant: VMware, Inc., Palo Alto, CA (US)

(72) Inventors: Xiaoyun Zhu, Cupertino, CA (US);
Rean Griffith, Oakland, CA (US);
Pradeep Padala, Sunnyvale, CA (US);
Aashish Parikh, Santa Clara, CA (US);
Parth Shah, Mountain View, CA (US);
Lei Lu, Williamsburg, VA (US)

(73) Assignee: VMware, Inc., Palo Alto, CA (US)

( * ) Notice: Subject to any disclaimer, the term of this patent is extended or adjusted under 35 U.S.C. 154(b) by 209 days.

(21) Appl. No.: 13/926,773

(22) Filed: Jun. 25, 2013

(65) Prior Publication Data

US 2014/0380307 A1    Dec. 25, 2014

(51) Int. Cl.
*G06F 9/50* (2006.01)
*G06F 9/455* (2006.01)

(52) U.S. Cl.
CPC .......... *G06F 9/45533* (2013.01); *G06F 9/5011* (2013.01); *G06F 9/5072* (2013.01); *Y02B 60/142* (2013.01); *Y02B 60/167* (2013.01)

(58) Field of Classification Search
CPC ................................................ G06F 9/45533
USPC .......................................................... 718/1
See application file for complete search history.

(56) References Cited

U.S. PATENT DOCUMENTS

| | | |
|---|---|---|
| 2003/0167270 A1 | 9/2003 | Werme et al. |
| 2005/0188088 A1 | 8/2005 | Fellenstein et al. |
| 2010/0146515 A1* | 6/2010 | Shpigelman ................ 718/104 |
| 2011/0099267 A1* | 4/2011 | Suri et al. ....................... 718/1 |
| 2012/0144039 A1 | 6/2012 | Watson et al. |
| 2012/0254400 A1 | 10/2012 | Iyengar et al. |
| 2012/0330711 A1 | 12/2012 | Jain et al. |
| 2013/0042253 A1* | 2/2013 | Yagi ............................ 718/104 |
| 2014/0215073 A1* | 7/2014 | Dow et al. .................... 709/226 |
| 2014/0280956 A1* | 9/2014 | Shu et al. ..................... 709/226 |

OTHER PUBLICATIONS

Gulati, Ajay, et al. "Cloud-scale resource management: challenges and techniques." Proceedings of the 3rd USENIX conference on Hot topics in cloud computing. USENIX Association, 2011.*

(Continued)

*Primary Examiner* — Emerson Puente
*Assistant Examiner* — Charlie Sun

(57) ABSTRACT

A system and method for managing resources in a distributed computer system that includes at least one resource pool for a set of virtual machines (VMs) utilizes a set of desired individual VM-level resource settings that corresponds to target resource allocations for observed performance of an application running in the distributed computer system. The set of desired individual VM-level resource settings are determined by constructing a model for the observed application performance as a function of current VM-level resource allocations and then inverting the function to compute the target resource allocations in order to meet at least one user-defined service level objective (SLO). The set of desired individual VM-level resource settings are used to determine final RP-level resource settings for a resource pool to which the application belongs and final VM-level resource settings for the VMs running under the resource pool, which are then selectively applied.

28 Claims, 8 Drawing Sheets

(56) References Cited

OTHER PUBLICATIONS

McQuarrie, Calculus I Homework: Inverse Functions and Logarithms, 2010. Retrieved from the Internet: <URL:http://facultypages.morris.umn.edu/~mcquarrb/teachingarchive/M1101/HW/1.6.pdf>.*

Invert, Wiktionary, retrieved on Mar. 9, 2015. Retrieved from the Internet: <URL:https://en.wiktionary.org/wiki/invert>.*

G. Banga, P. Druschel, and J. Mogul; "Resource containers: A new facility for resource management in server systems"; In Proc. of OSDI, pp. 45-58, 1999.

P. Barham, B. Dragovic, K. Fraser, S. Hand, T. Harris, A. Ho,R. Neugebauer, I. Pratt, and A. Warfield; "Xen and the Art of Virtualization"; In Proc. of SOSP, 2003.

A. Beitch, B. Liu, T. Yung, R. Griffith, A. Fox, and D. Patterson; "Rain: A Workload Generation Toolkit for Cloud Computing Applications"; In U.C. Berkeley Technical Publications, Feb. 10, 2010.

P. Bodik, R. Griffith, C. Sutton, A. Fox, M. Jordan, and D. Patterson; "Statistical Machine Learning Makes Automatic Control Practical for Internet Datacenters"; In Proc. of HotCloud, 2009.

J. Chase, D. Anderson, P. Thakar, A. Vandat, and R. Doyle; "Managing Energy and Server Resources in Hosting Centers"; In Proc. of SOSP, Oct. 2001.

Y. Diao, N. Gandhi, J. Hellerstein, S. Parekh, and D. Tilbury; "MIMO Control of an Apache Web server: Modeling and Controller Design"; In Proc. of ACC, 2002.

A. Gulati, A. Merchant, and P. J. Varman; "mclock: Handling Throughput Variability for Hypervisor IO Scheduling"; In OSDI, pp. 437-450, USENIX Association, 2010.

A. Gulati, A. Holler, M. Ji, G. Shanmuganathan, C. Waldspurger, and X. Zhu; "VMware Distributed Resource Management: Design, Implementation, and Lessons Learned"; VMware Technical Journal, Mar. 1, 2012.

A. Gulati, G. Shanmuganathan, X. Zhang, and P. Varman; "Demand Based Hierarchical QoS Using Storage Resource pools"; In Proc. of the USENIX Annual Technical Conference, USENIX Association, 2012.

C. Karamanolis, M. Karlsson, and X. Zhu; "Designing Controllable Computer Systems"; In Proc. of HotOS, Jun. 2005.

R. Nathuji, A. Kansai, and A. Ghaffarkhah; "Q-Clouds: Managing Performance Interference Effects for QoS-Aware Clouds"; In Proc. of EuroSys, Apr. 2010.

K. Shen, H. Tang, T. Yang, and L. Chu; "Integrated Resource Management for Cluster-based Internet Services"; ACM SIGOPS Operating Systems Review, 36(SI):225-238, 2002.

VMware, Inc.; "vSphere Resource Management Guide: ESXi 5.1, vCenter Server 5.1"; Aug. 2012.

C. Waldspurger; "Memory Resource Management in VMware ESX Server"; In Proc. OF OSDI, Dec. 2002.

Y. Zhang, A. Bestavros, M. Guirguis, I. Matta, and R. West; "Friendly Virtual Machines: Leveraging a Feedback-Control Model for Application Adaptation"; In Proc. of VEE, 2005.

MongoDB; http://www.mongodb.org, accessed Feb. 4, 2014.

Windows Hyper-V Server; http://technet.microsoft.com/en-us/library/cc753637(v=WS.10).aspx, accessed Feb. 4, 2014.

VMware vSphere Web Services SDK; https://www.vmware.com/support/developer/vc-sdk/, accessed Feb. 4, 2014.

T. Abdelzaher, K. Shin, and N. Bhatti; "Performance Guarantees for Web Server End-Systems: A Control-Theoretical Approach"; IEEE Transactions on Parallel and Distributed Systems, 13(1), 2002.

Y. Lu, T. Abdelzaher, and A. Saxena; "Design, Implementation and Evaluation of Differentiated Caching Serices"; IEEE Transactions on Parallel and Distributed Systems, 15(5), May 2004.

P. Padala, K. Hou, K. Shin, X. Zhu, M. Uysal, Z. Wang, S. Singhal, and A. Merchant; "Automated Control of Multiple Virtualized Resources"; In Proc. of EuroSys, 2009.

Z. Wang, Y. Chen, D. Gmach, S. Singhal, B. Watson, W. Rivera, X. Zhu and C. Hyser; "AppRAISE: Application-Level Performance Management in Virtualized Server Environments"; IEEE Trans. on Network and Service Management, 6(4): 240-254, 2009.

J. Xu, M. Zhao, J. Fortes, R. Carpenter and M. Yousif; "Autonomic resource management in virtualized data centers using fuzzy logic-based approaches"; Cluster Computing Journal, 11, 2008.

VMware ESX and ESXi; http://www.vmware.com/products/vsphere/esxi-and-esx/, accessed Feb. 4, 2014.

European Search Report, EP14171336, Apr. 25, 2016.

* cited by examiner

PERFORMANCE-DRIVEN RESOURCE MANAGEMENT IN A DISTRIBUTED COMPUTER SYSTEM

BACKGROUND

In a cloud computing environment, multiple virtual datacenters (VDCs) can be implemented using physical devices, such as host computers and storage devices, which can support virtual machines (VMs), and applications executed by those VMs. A VDC is an example of a resource pool (RP), which is a logical container representing an aggregate resource allocation for a collection of VMs. A single VDC may support multiple RPs. Resource management techniques for VDCs are important to ensure that applications running on the VDCs are operating at their service level objectives (SLOs). Existing resource allocation techniques offer powerful resource control primitives, such as reservations, limits and shares, which can be set at a VM level or at an RP level (including VDCs) to ensure SLOs of applications running on the VDCs are being met.

These resource control primitives allow administrators to control the absolute and relative amount of resources consumed by a VM or an RP (including a VDC). However, determining the right settings of the resource control primitives can be extremely challenging due to various factors. As an example, different VMs supporting the same application may require different amount of resources to meet the application performance targets. In addition, an application running on a VDC may have time-varying demands, which means that resource control settings determined for one period of time may become ineffective at a later period of time. Thus, setting the resource controls for multiple RPs such that applications running on the RPs get enough resources to meet their respective SLOs becomes a nearly insoluble task.

SUMMARY

A system and method for managing resources in a distributed computer system that includes at least one resource pool for a set of virtual machines (VMs) utilizes a set of desired individual VM-level resource settings that corresponds to target resource allocations for observed performance of an application running in the distributed computer system. The set of desired individual VM-level resource settings are determined by constructing a model for the observed application performance as a function of current VM-level resource allocations and then inverting the function to compute the target resource allocations in order to meet at least one user-defined service level objective (SLO). The set of desired individual VM-level resource settings are used to determine final RP-level resource settings for a resource pool to which the application belongs and final VM-level resource settings for the VMs running under the resource pool, which are then selectively applied.

A method for managing resources in a distributed computer system that includes at least one resource pool for a set of VMs in accordance with an embodiment of the invention comprises constructing a model for observed performance of an application running in the distributed computer system as a function of current VM-level resource allocations, inverting the function to compute a set of target resource allocations in order to meet at least one user-defined service level objective (SLO), determining a set of desired individual VM-level resource settings corresponding to the target resource allocations, determining final RP-level resource settings for a resource pool to which the application belongs and final VM-level resource settings for the VMs running under the resource pool based on at least the set of desired individual VM-level resource settings, current RP-level resource settings of the resource pool and available resource capacity of the resource pool, and applying at least one of the final RP-level resource settings and the final VM-level resource settings to at least one of the resource pool and the VMs running under the resource pool based on at least one resource property of the resource pool. In some embodiments, the steps of this method are performed when program instructions contained in a computer-readable storage medium is executed by one or more processors of the host computers.

An application resource allocation module for a distributed computer system that includes at least one resource pool for a set of VMs in accordance with an embodiment of the invention comprises at least one application manager, at least one resource pool manager and an actuator. The application manager includes a model builder configured to construct a model for observed performance of the application as a function of current VM-level resource allocations, an application controller configured to invert the function to compute a set of target resource allocations in order to meet at least one user-defined service level objective (SLO), and a resource controller configured to determine a set of desired individual VM-level resource settings corresponding to the target resource allocations. The resource pool manager is configured to determine final RP-level resource settings for a resource pool to which the application belongs and final VM-level resource settings for the VMs running under the resource pool based on at least the set of desired individual VM-level resource settings, current RP-level resource settings of the resource pool and available resource capacity of the resource pool. The actuator is configured to apply at least one of the final RP-level resource settings and the final VM-level resource settings to at least one of the resource pool and the VMs running under the resource pool based on at least one resource property of the resource.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
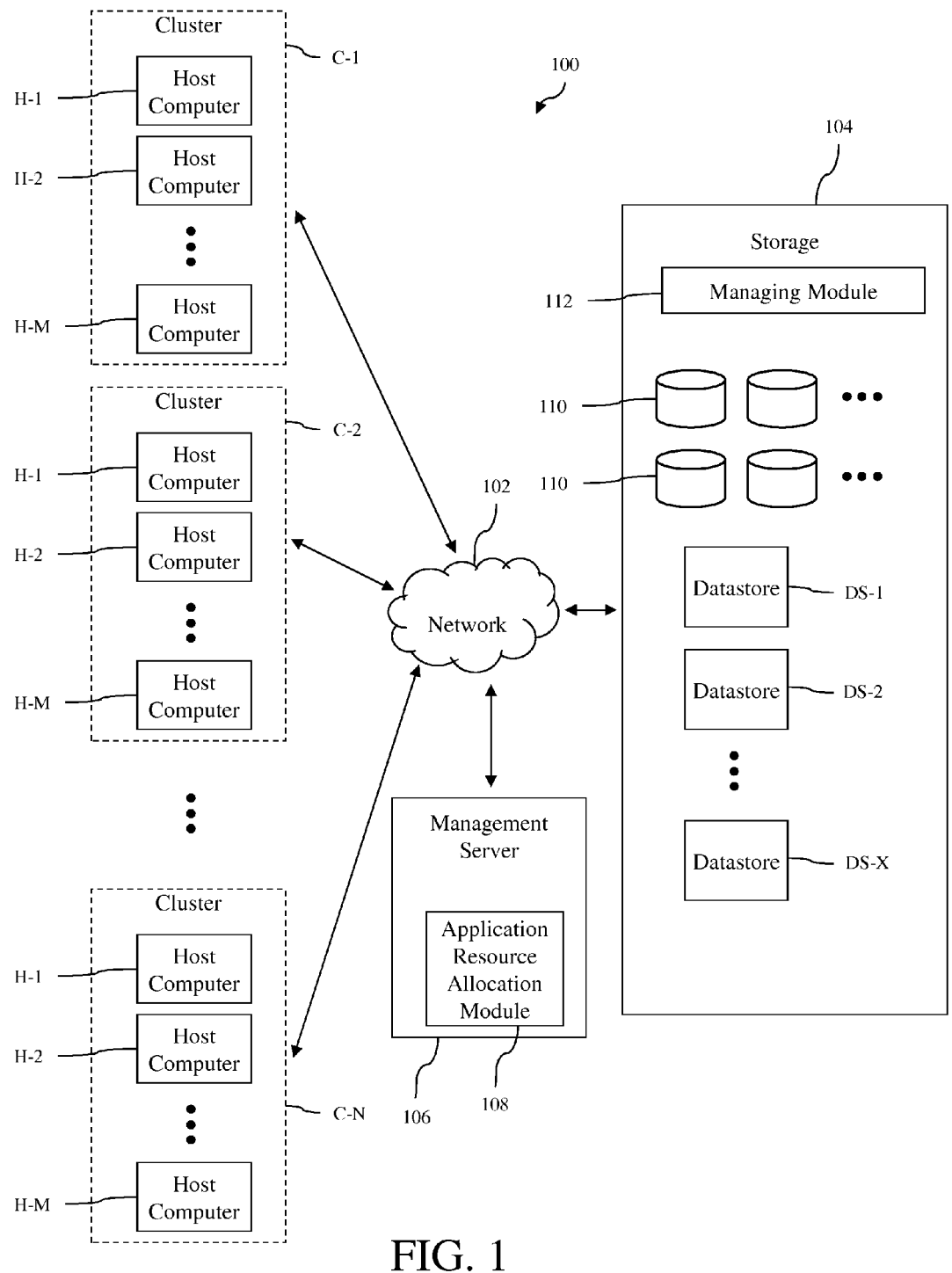
FIG. 1 is a block diagram of a distributed computer system in accordance with an embodiment of the invention.

Turning now to FIG. 1, a distributed computer system 100 that provides a cloud computing environment in accordance with an embodiment of the invention is shown. The distributed computer system may be, for example, a computer network system. As shown in FIG. 1, the distributed computer system includes a network 102, clusters C-1, C-2 . . . C-N of host computers (where N is a positive integer), storage 104 and a management server 106 with a resource allocation module 108. The exact number of host computer clusters included in the distributed computer system can be any number of clusters from one to tens of clusters or more. The host computers of the different clusters, the storage and the management server are connected to the network. Thus, each of the host computers in the clusters and the management server are able to access the storage via the network and may share the resources provided by the storage. Consequently, any process running on any of the host computers and the management server may also access the storage via the network.

In the illustrated embodiment, each of the clusters C-1, C-2 . . . C-N includes a number of host computers H-1, H-2 . . . H-M (where M is a positive integer). The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack.

Figure 2:
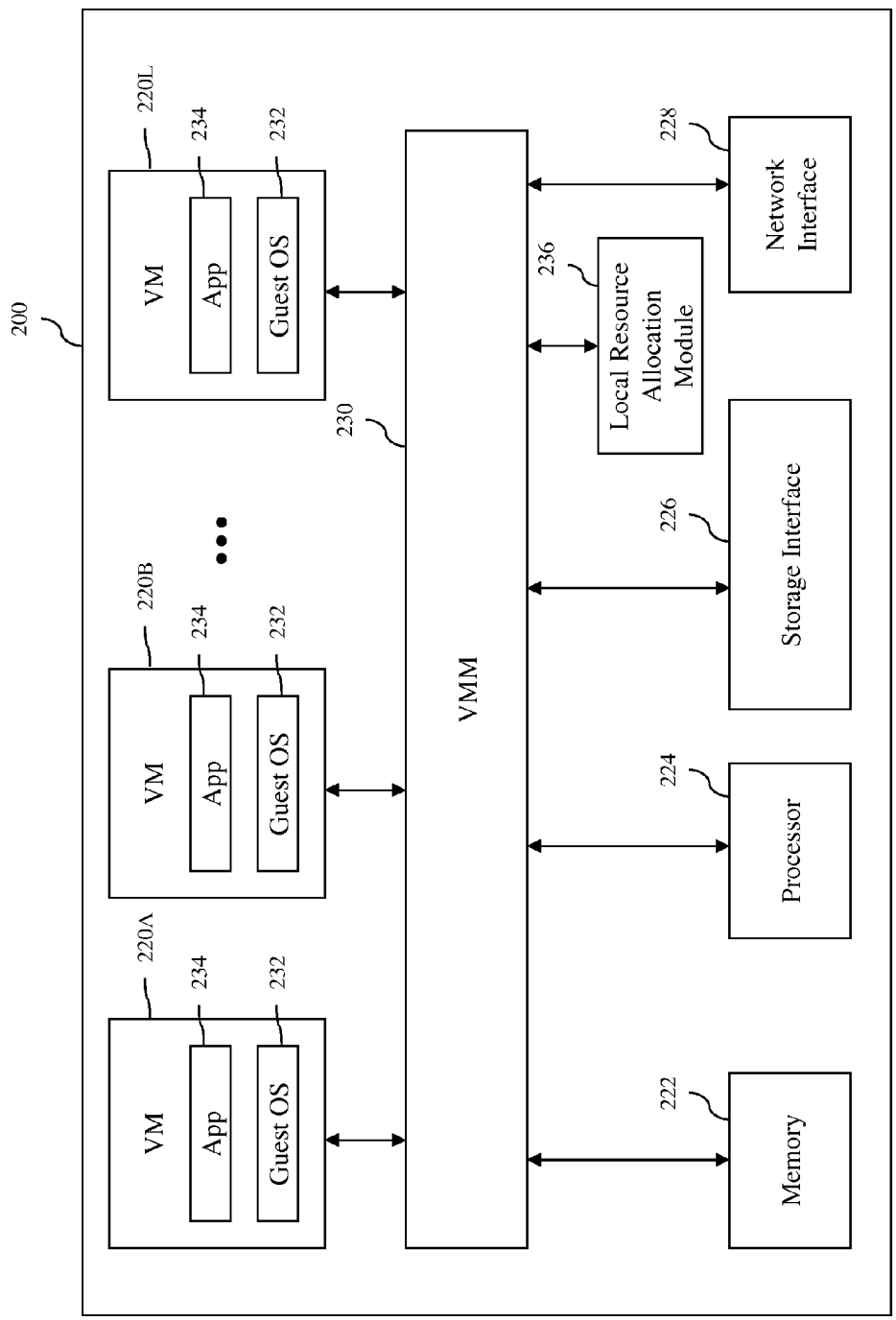
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory, which may be random access memory (RAM), is the primary memory of the host computer. The processor can be any type of a processor, such as a central processing unit (CPU) commonly found in a server. The storage interface is an interface that allows that host computer to communicate with the storage 104. As an example, the storage interface may be a host bus adapter or a network file system interface. The network interface is an interface that allows the host computer to communicate with other devices connected to the network 102. As an example, the network interface may be a network adapter.

In the illustrated embodiment, the VMs 220A, 220B . . . 220L run on top of a virtual machine monitor (VMM) 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system (OS) 232 and one or more guest applications (APP) 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local resource allocation module 236 that operates as part of a local resource management system, such as a distributed resource scheduler system, to manage resources consumed by the VMs 220A, 220B . . . 220L. The local resource allocation module in each host computer of a cluster cooperatively operates with the local resource allocation modules in the other host computers in the same cluster to perform resource scheduling, which includes balancing the loads of software processes and/or storage resource scheduling. Although the local resource allocation module is illustrated in FIG. 2 as being separate from the virtual machine monitor 230, the local resource allocation module may be implemented as part of the virtual machine monitor. In some embodiments, the local resource allocation module is implemented as software programs running on the host computer. However, in other embodiments, the local resource allocation module may be implemented using any combination of software and hardware.

Turning back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and Hyper-SCSI.

The storage 104 is used to store data for the host computers H-1, H-2 . . . H-M of the clusters C-1, C-2 . . . C-N, which can be accessed like any other storage device connected to computer systems. In an embodiment, the storage can be accessed by entities, such as clients (e.g., VMs) running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is an integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. For virtual machines, the datastores may be used to store virtual storage, e.g., virtual disks, used by each of the virtual machines, as well as other files needed to support the virtual machines. One or more datastores may be associated with one or more host computers. Thus, each host computer is associated with at least one datastore. Some of the datastores may be grouped into one or more clusters of datastores, which are commonly referred to as storage pods.

The management server 106 operates to monitor and manage the host computers H-1, H-2 . . . H-M of the clusters C-1, C-2 . . . C-N and/or the storage 104 of the distributed computer system 100. The management server may be configured to monitor the current configurations of the host computers and the clients running on the host computers, for example, virtual machines (VMs). The monitored configurations may include hardware configuration of each of the host computers, such as CPU type and memory size, and/or software configurations of each of the host computers, such as operating system (OS) type and installed applications or software programs. The monitored configurations may also include clustering information, i.e., which host computers are included in which clusters. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource settings, such as limit, reservation, entitlement and share values for various resources, e.g., CPU, memory, network bandwidth and storage, which are consumed by the clients.

The management server 106 may also be configured to monitor the current configuration of the storage 104, including the physical storage devices 110 and the datastores DS-1, DS-2 . . . DS-X of the storage. The monitored storage configuration may include storage device configuration, which may include the number of storage devices in the storage, the device type of the storage devices, such as solid-state devices (SSDs) and hard disks, and storage capacity of each of the storage devices. The monitored storage configuration may also include datastore configuration, such as storage capacity of each of the datastores and connections and associations between the datastores and the host computers H-1, H-2 . . . H-M and/or the clients running on the host computers.

The management server 106 may also be configured to monitor the current usage of resources by the clients, the host computers H-1, H-2 . . . H-M and the clusters C-1, C-2 . . . C-N of host computers. For example, the management server may monitor CPU processing usage, memory usage, network usage and storage usage of the clients. The management server may also be configured to store the usage of resources by the clients, the host computers and the clusters of host computers to maintain historical resource usage information. The historical resource usage information can then be used to develop various resource usage statistics for the individual clients, the individual host computers and the individual clusters of host computers.

The management server 106 may also be configured to perform various operations to manage the clients, the host computers H-1, H-2 . . . H-M, the clusters C-1, C-2 . . . C-N of host computers and the storage 104. As an example, the management server may be configured to initially place new clients onto one or more of the host computers in particular clusters and move existing clients to different host computers and/or different clusters. The management server can assign software processes to the host computer clusters in a manner that balances the loads of the software processes running on the host computer clusters. Processes, such as VMs, can be balanced based on allocation policies, resource demand, and the availability of resources provided by the host computer clusters. Balancing can be applied to computer resources such as processor time, i.e., CPU cycles, memory space, network bandwidth (including any type of input/output or bus bandwidth), storage space, power consumption, cache space, software licenses, and so on. To effectively balance the computing resources, a running VM can be migrated from one host computer cluster to another, in a process that is known as live VM migration. As another example, the management server may be configured to power down particular clients and/or host computers to conserve power.

In order to perform these various operations, the management server 106 may maintain requirements and preferences for the clients with respect to the host computers and the datastores. These requirements and preferences may include affinity or anti-affinity rules for some of the clients, which may be mandatory or preferential. For example, these affinity or anti-affinity rules may include rules that specify which clients should run on the same host computer or be kept on separate host computers. As another example, these affinity or anti-affinity rules may include rules that specify which host computers are acceptable to clients and which host computers are not. The management server may be configured or programmed to perform other operations to manage the distributed computer system 100. In an implementation, the management server is a VMware vCenter™ server with at least some of the features available for such server.

In an embodiment, the management server 106 is further configured to allow administrators to define and create VDCs and/or other resource pools (RPs). Each of the RPs, including VDCs, is a logical container that represents an aggregate resource allocation for a collection of virtual machines. Each RP may include one or more smaller RPs, each of which may further include one or more even smaller RPs. A VDC can be viewed as a particular type of RPs, which typically encapsulates an aggregation of resources that are allocated to an individual organization. The configured capacity of the VDC can be tied to how much the organization is being charged. A VDC can contain multiple RPs, each supporting a specific department of the organization. In addition, each RP of the VDC can contain one or more applications, each supporting a specific business process. Thus, the resources provided by the distributed computer system 100 can be represented in a hierarchical RP structure.

Figure 3:
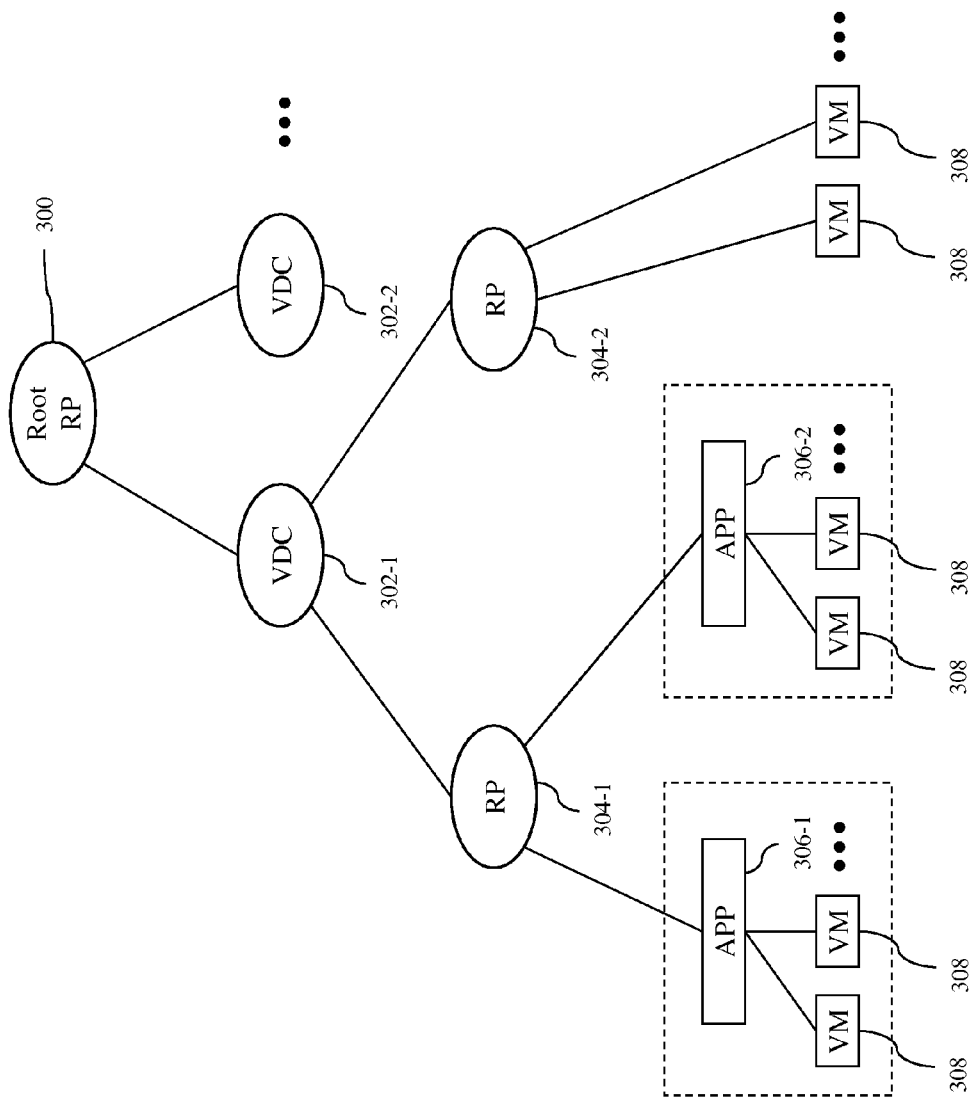
FIG. 3 illustrates a hierarchical resource pool (RP) structure for the distributed computer system shown in FIG. 1 with multiple VDCs is shown in accordance with an embodiment of the invention.

In FIG. 3, an example of a hierarchical RP structure for the distributed computer system 100 with multiple VDCs is shown. As illustrated in FIG. 3, the hierarchical RP structure includes a root RP 300, VDCs 302, RPs 304, applications 306 and VMs 308. The root RP represents the total amount of resources of the distributed computer system. The resources of the root RP are allocated to the VDCs. The allocated resources of each VDC are further allocated to the RPs of that VDC. The allocated resources of each RP are still further allocated to the VMs of that RP. Some of these VMs may be executing applications. These applications may be applications supported by multiple VMs, such as multi-tier applications, each with a web tier, an application tier and a database tier. In the illustrate example, the RP 304-1 includes an application 306-1 running on some of the VMs of the RP 304-1 and another application 304-2 running on other VMs of the RP 304-1. However, the RP 304-2 does not include any applications running on multiple VMs.

In an embodiment, the resource controls that can be set by the management server 106 includes reservations, limits and shares for individual VMs and RPs, including VDCs, in the distributed computer system 100. Reservation values specify the minimum amount of certain resource that VMs or RPs must receive, even when this resource is overcommitted, in order to, for example, provide a guaranteed amount of the resource to a specific application or department within an organization. Limit values specify the maximum allocation that should be made to VMs or RPs in order to, for example, prevent demand spikes within one application or RP from affecting others. Share values, i.e., the numbers of shares, provide a measure of relative importance between a group of VMs or a group of RPs within the same parent RP, and thus, are used to prioritize allocation when capacity is constrained. Thus, share values allow multiple applications or RPs within the same organization to share resources in proportion to their respective priorities.

The application resource allocation module 108 operates to compute resource control settings for VMs and/or RPs associated with applications running on the distributed computer system 100 for one or more computer resources so that application SLO requirements are met. The computer resources may be any resource that can be allocated, such as processor time, i.e., CPU cycles, memory space, network bandwidth (including any type of input/output or bus bandwidth), storage space, power consumption and cache space. The application resource allocation module may be periodically activated, i.e., called to run, at predefined intervals, for example, every five minutes. In addition, the resource allocation module may be activated at will when certain events or conditions occur. For example, the resource allocation module may be activated after a business critical application is deployed and starts running, or when the latency of an application exceeds a threshold. Alternatively, the application resource allocation module may be activated manually by a user of the management server 106.

Figure 4:
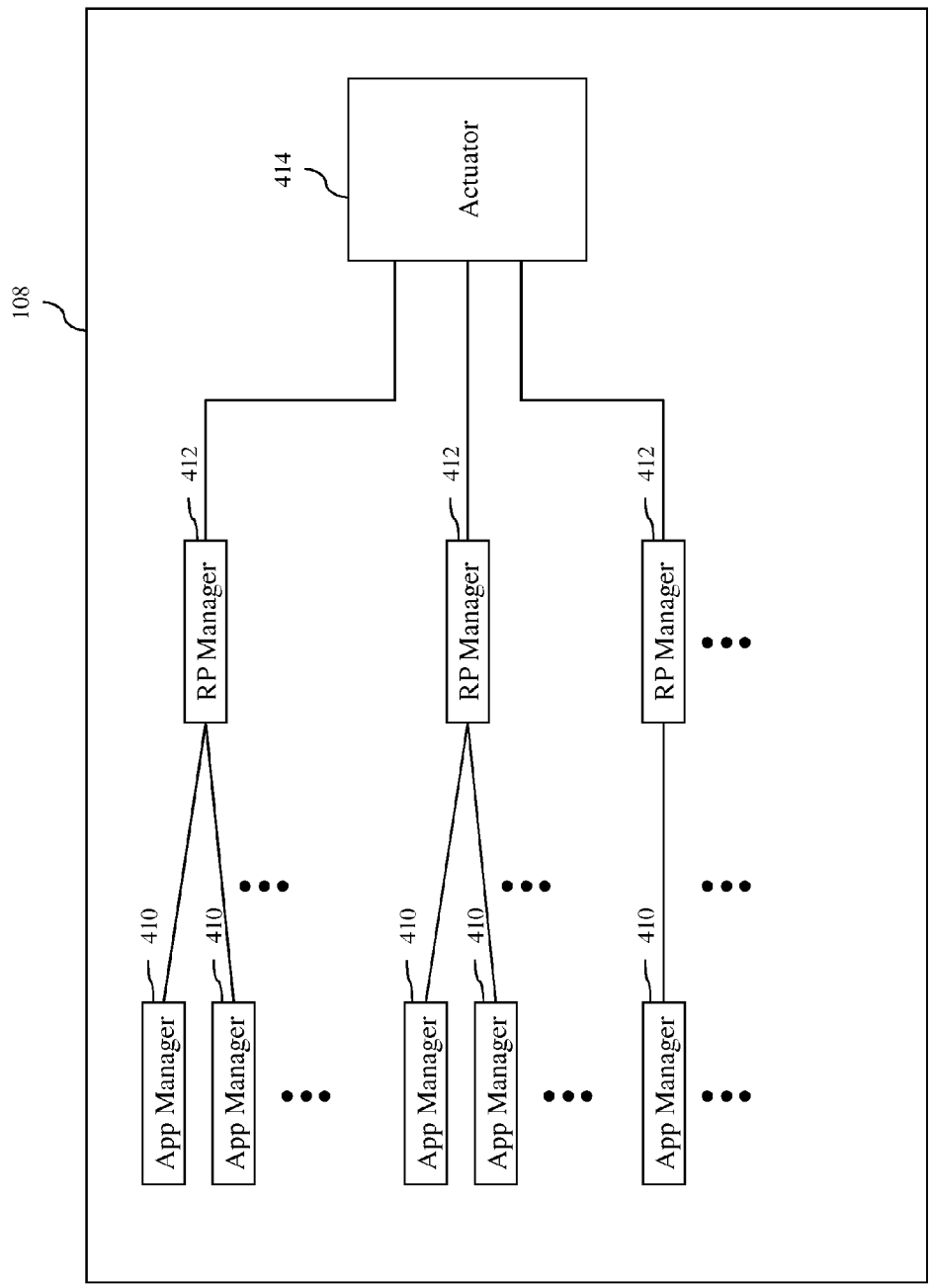
FIG. 4 is a block diagram of an application resource allocation module in accordance with an embodiment of the invention.

Turning now to FIG. 4, a block diagram of components of the application resource allocation module 108 in the management server 106 in accordance with an embodiment of the invention is shown. As illustrated in FIG. 4, the application resource allocation module 108 includes a number of application managers 410, a number of RP managers 412 and an actuator 414. Each application manager is configured to determine resource control settings for the VMs in the distributed computer system 100 running a particular application to satisfy any application SLO requirements. Thus, the number of application managers included in the application resource allocation module 108 may coincide with the number of applications running on the distributed computer system 100 that are to be managed by the application resource allocation module. Each RP manager is configured to determine appropriate resource control settings for a particular RP and/or final resource control settings for the VMs in that RP. Thus, the number of RP managers included in the application resource allocation module 108 may coincide with the number of RPs that exist for the distributed computer system 100 that are to be managed by the application resource allocation module. The actuator is configured to set or apply the resource control settings for the VMs and/or the RPs, as determined by the RP managers. These components of the application resource allocation module can be implemented as software, hardware or a combination of software and hardware. In an embodiment, the application resource allocation module is installed in the management server 106. In a particular implementation, the application resource allocation module may be installed in a VMware vCenter™ server that is executed by one or more processors associated with the server. However, in other embodiments, the application resource allocation module may be installed in any other computer system.

Figure 5:
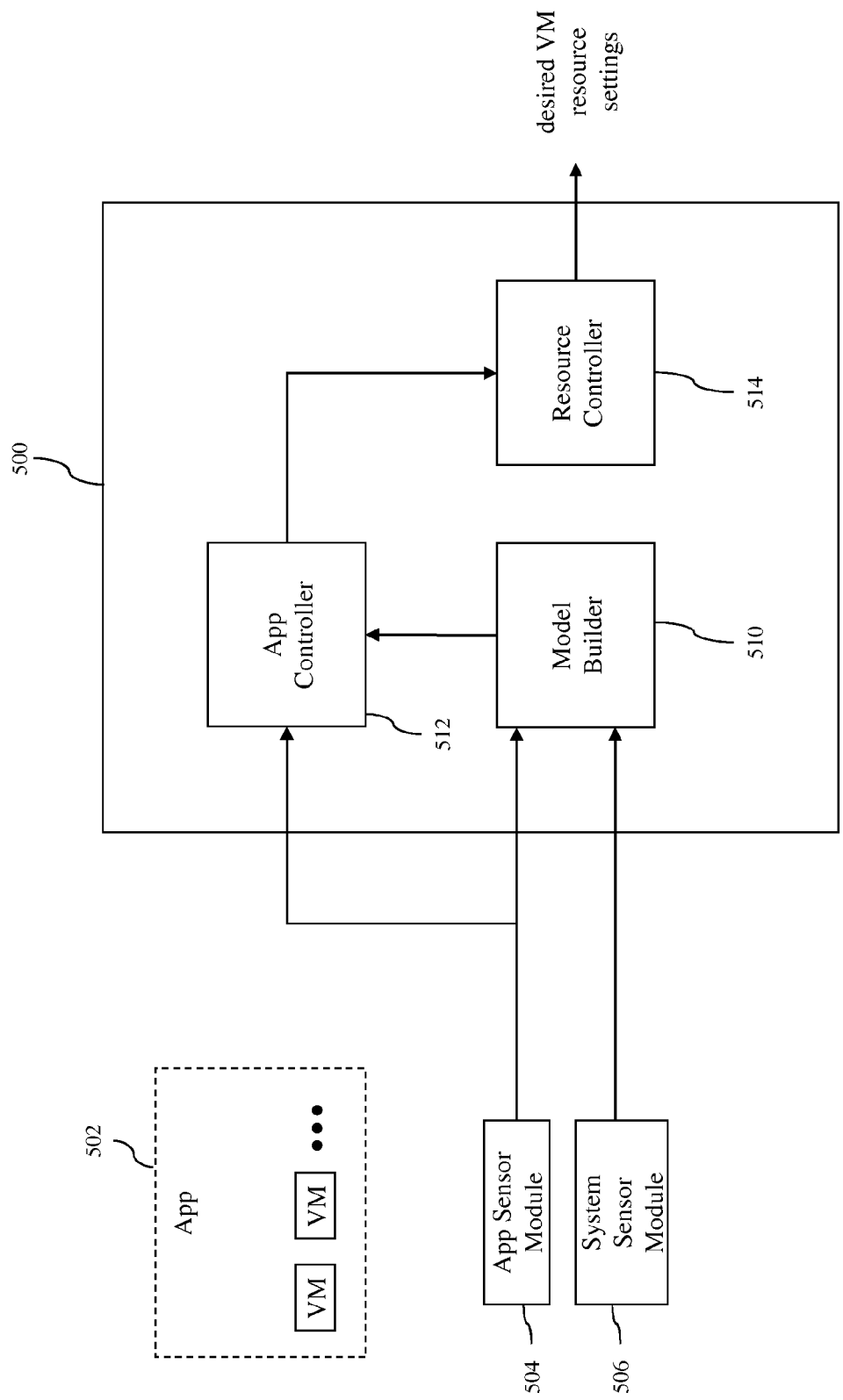
FIG. 5 is a block diagram of an application manager of the application resource allocation module shown in FIG. 4 in accordance with an embodiment of the invention.

In FIG. 5, an application manager 500 in accordance with an embodiment of the invention is shown. The application manager 500 is representative of the application managers 410 of the application resource allocation module 108, illustrated in FIG. 4. As illustrated in FIG. 5, the application manager 500 is paired with an application 502 executed by a number of VMs to manage the application. The application 500 is representative of an application running in the distributed computer system 100. The application 502 being managed by the application manager 500 may be a multi-tiered application with each tier of the application being executed by one or more VMs. As an example, the application 502 may be a multi-tiered application with a web tier, an application tier and a database tier, each of the tiers being supported by multiple VMs.

As shown in FIG. 5, the application 502 is monitored by an application sensor module 504 and a system sensor module 506. The application sensor module periodically collects various application-level performance metrics, such as throughput, average response time and percentile response time, for all the applications running on the distributed computer system, including the application 502. The system sensor module 506 periodically measures and keeps track of current real-time resource allocations for all the VMs in the distributed computer system, including the VMs running the application 502. In a particular implementation, resource utilization statistics are collected by the system sensor module though vSphere™ Web Services application programming interface (API). As an example, the system sensor module may collect the average per-VM CPU utilization over a time interval using a "usage" performance counter and the per-VM memory utilization using a "consumed" counter. In an embodiment, the application sensor module and the system sensor module are part of the application resource allocation module 500. In other embodiments, the application sensor module and the system sensor module may be part of another module or system in the management server 106.

As shown in FIG. 5, the application manager 500 includes a model builder 510, an application controller 512 and a resource controller 514. The model builder is configured to, using the information from the application sensor module 504 and the system sensor module 506, construct and iteratively refine a model for the observed application performance as a function of the VM-level resource allocations, i.e., the resource allocations of the VMs running the application 502. The application controller 512 is configured to invert the function to compute a new set of "desired" or target resource allocations in order to meet user-defined SLOs. The resource controller is configured to determine a set of individual VM-level resource settings that would cause the VMs running the application 502 to acquire the desired resource allocations in the next control interval. In one particular implementation, the model builder, the application controller and the resource controller constitute an instance of the application manager for a single application. These components of the application manager are described in more detail below.

The following table lists the notation used herein to describe the model builder 510, the application controller 512 and the resource controller 514 of the application manager 500.

| | |
|---|---|
| A | set of applications |
| $M_a$ | set of VMs in application a ∈ A |
| | e.g., $M_a = \{vm_1, vm_2\}$ |
| t | index for control interval |
| R | set of resource types controlled |
| | e.g., R = {cpu, memory} |
| $u^*_{a,m,r}$ | desired allocation of resource type r in VM m of application a, $0 \leq u^*_{a,m,r} \leq 1$ |
| $u_{a,m,r}$ | measured allocation of resource type r in VM m of application a, $0 \leq u_{a,m,r} \leq 1$ |
| $p_a$ | measured performance of application a |
| $p_{a,ref}$ | target performance of application a |
| $\hat{p}_a$ | normalize performance of application a where $\hat{p}_a = p_a/p_{a,ref}$ |
| $\bar{p}_a$ | predicted performance of application a |

For application a∈A, the resource allocation variable $u_a$ is defined to be a vector that contains all measured resource allocations for application a. For example, for an application of two VMs ($M_a = \{vm_1, vm_2\}$), if two resources are considered (R={cpu, memory}), $u_a$ is a vector where $u_a = (u_{a,vm1,cpu}, u_{a,vm2,cpu}, u_{a,vm2,mem})$. $U_a(t)$ represents the measured resource-allocation values for application a during control interval t.

The model builder 510 is configured to compute a linear model that approximates the nonlinear relationship between the resource allocations to application $a(u_a)$ and its normalized performance ($\hat{p}_a$). As with most real-world systems, this relationship is often non-linear and workload-dependent. Nevertheless, many nonlinear models can be approximated by a linear model in small-enough regions around an operating point. In an embodiment, the following auto-regressive-moving-average (ARMA) model is used to represent the relationship between the resource allocations to application $a(u_a)$ and its normalized performance ($\hat{p}_a$):

$$\hat{p}_a(t) = a(t)\hat{p}_a(t-1) + b^T(t)u_a(t), \quad \text{(Equation 1)}$$

where $\hat{p}_a(t)$ is the normalized performance of the application a for the current control time interval, a(t) is an auto-regressive parameter, $\hat{p}_a(t-1)$ is the normalized performance of the application a for the previous control interval, $b^T(t)$ is a vector of moving-average parameters and $u_a(t)$ is the resource allocation vector for the current control time interval. This model is self-adaptive as its parameters a(t) and b(t) are re-estimated in every control time interval t. Thus, the linear model is updated periodically to adapt to changes in the workload and/or system conditions.

The application controller 512 is configured to determine the resource allocations for all the VMs running the application such that the application can meet its performance SLOs. The application controller seeks the VM-level resource allocations for the next control interval that minimizes the following cost function:

$$J(u_a(t+1)) = (\hat{p}_a(t+1)-1)^2 + \lambda \|u_a(t+1)-u_a(t)\|^2, \quad \text{(Equation 2)}$$

where $u_a(t+1)$ is the resource allocation vector for the next control time interval (t+1), $\hat{p}_a(t+1)$ is the normalized performance of the application for the next control time interval as predicted by Equation 1, $u_a(t)$ is the resource allocation vector for the current control time interval and λ is a scaling factor. In Equation 2, the scaling factor λ captures the trade-off between the performance cost that penalizes the application's performance for deviating from its target (denoted by the normalized value equal to 1), and the stability cost that penalizes large oscillations in the resource allocation values.

Using the linear model of Equation 1, the optimal resource allocations that minimizes the cost function of Equation 2 can be solved and expressed as follows:

$$u^*_a(t+1) = (bb^T + \lambda I)^{-1}((1-a\hat{p}_a(t))b + \lambda u_a(t)),$$ (Equation 3)

where $u^*_a(t+1)$ is the desired resource allocation vector for the next control time interval (t+1), b is the moving-average parameter vector, $b^T$ is transpose of b, $\lambda$ is the scaling factor, I is the identity matrix, a is the auto-regressive parameter, $\hat{p}_a(t)$ is the normalized performance of the application for the current control time interval, $u_a(t)$ is the resource allocation vector for the current control time interval.

The resource controller 514 is configured to translate the optimal resource allocation values computed by the application controller 512 to desired VM-level resource control settings. The translation is needed for the following reasons: (1) the output of the application controller is in percentage units, whereas the VM-level resource control settings are in absolute units, e.g., the reservation and limit values for both CPU and memory are in units of megahertz (MHz) or megabytes (MB), and (2) in order to deal with inaccuracies in the computed optimal resource allocations, more resources are allocated than the computed values as a "safety buffer." The resource controller operates to compute the desired resource control settings, e.g., reservation and limit values, for each resource type being considered.

Figure 6:
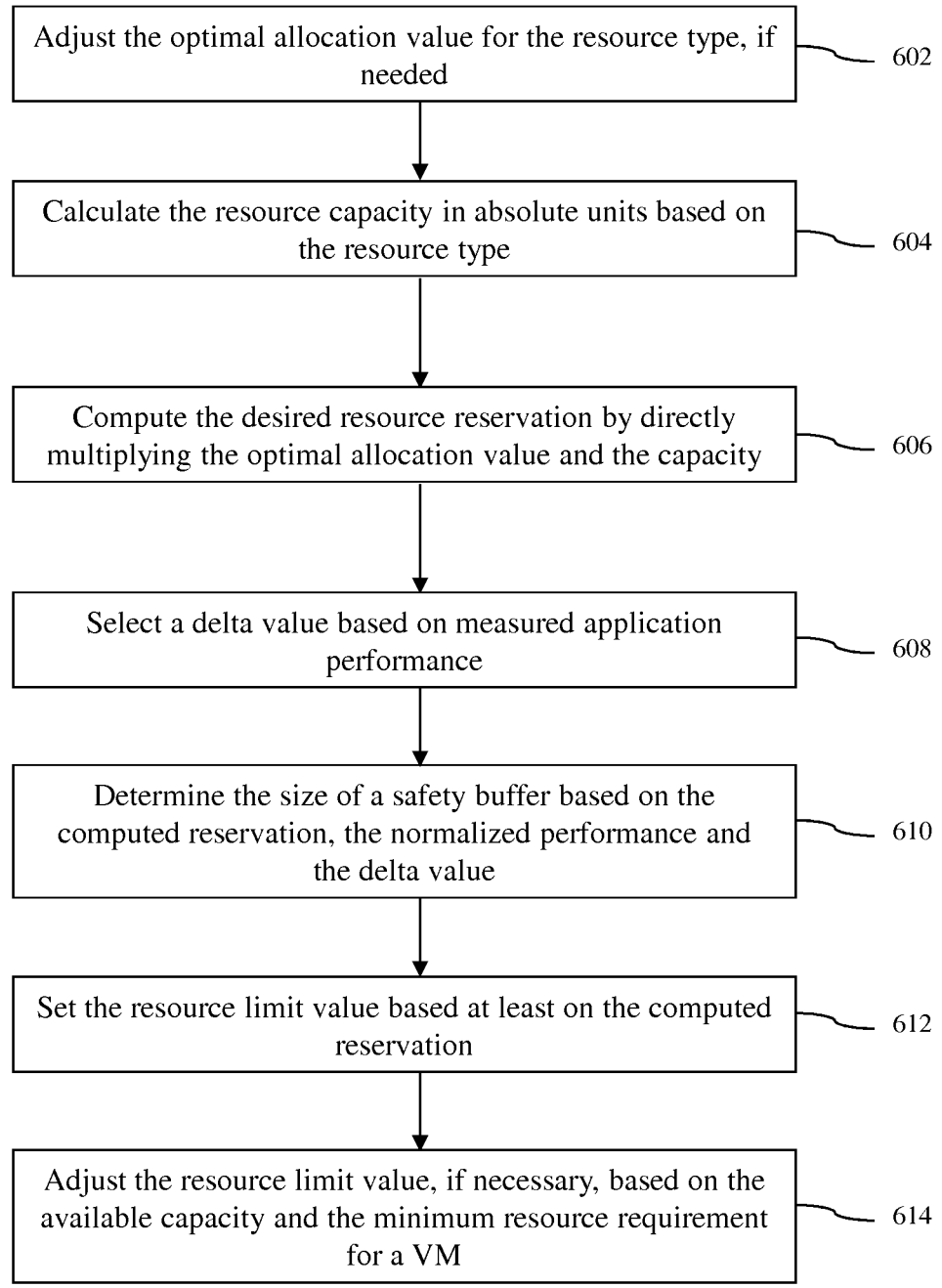
FIG. 6 is a flow diagram showing the operation of a resource controller of the application manager shown in FIG. 5 to calculate, for each VM running an application, desired VM-level resource control settings for each resource type in accordance with an embodiment of the invention.

The operation of the resource controller 514 to calculate, for each VM running the application 500, desired VM-level resource control settings for each resource type in accordance with an embodiment of the invention is described with reference to FIG. 6. At block 602, the optimal allocation value received from the application controller 512 for a particular resource type is adjusted if the optimal allocation value falls outside of a valid range of values. At block 604, the resource capacity is calculated in absolute units based on the resource type. The resource capacity of a VM is the amount of resource configured for the VM for each resource type, which is static. At block 606, the desired resource reservation is computed based on the optimal allocation value and the capacity. In an embodiment, the desired resource reservation is computed by directly multiplying the optimal allocation value and the capacity. At block 608, a delta value is selected based on measured application performance. At block 610, the size of a safety buffer is determined by the computed reservation, the normalized performance and the delta value. At block 612, the resource limit value is set based on at least the computed reservation. In an embodiment, the resource limit value is set based on the computed reservation and the safety buffer size. In a particular implementation, the resource limit value is set to the sum of the computed reservation and the safety buffer size. In other embodiments, the resource limit value can be set based on the computed reservation, a constant value and/or the application performance. At block 614, the resource limit value is adjusted, if necessary, based on the available capacity and the minimum resource requirement for a VM so that the final value is feasible.

In one particular implementation, the resource controller 514 executes the following algorithm on every VM running the application 500 for both CPU and memory resources to calculate reservation and limit settings.

| Algorithm: Calculate Desired Reservation and Limit settings |
|---|
| input: optimal allocation u*, resource type type, and normalized performance perf (i.e., $\hat{p}_a$) |
| output: Reservation and Limit value pair |
| 1   if u* < 0 then u* ← 0; |
| 2   if u* > 1 then u* ← 1; |

-continued

| Algorithm: Calculate Desired Reservation and Limit settings |
|---|
| 3   capacity ← 0; |
| 4   if type = CPU then |
| 5      \|   capacity ← getNumVirtualCPUs( ) * getCPUMHz( ); |
| 6   else if type = MEM then |
| 7      \|   capacity ← getMemoryMB( ); |
| 8   resv ← u* * capacity; |
| 9   delta ← 0; |
| 10  if perf < 1 then delta ← low else delta ← high; |
| 11  buffer ← delta * perf * resv; |
| 12  limit ← resv + buffer; |
| 13  if limit > capacity then limit ← capacity; |
| 14  if type = CPU then |
| 15    \|   limit ← max (MINCPU, limit); |
| 16  if type = MEM then |
| 17    \|   limit ← max (MINMEM, limit); |
| 18  return < resv,limit > |

In the above algorithm, the optimal allocation value u* for a VM is first adjusted if it falls outside of a valid range (line 1-2). The resource capacity is then calculated in absolute units based on the specific resource type, i.e., CPU or memory (line 3-7). Next, the desired resource reservation is computed by directly multiplying the optimal allocation value and the capacity (line 8). A low or high delta value is then selected depending on whether the measured application performance is below or above the target (line 10). The selected delta value is used to determine the size of a "safety buffer." If the application performance is better than the SLO (perf<1), a relatively small buffer size can reduce the performance fluctuation around its target. If the performance is worse than the SLO (perf>1), a relatively large buffer size is needed to improve the performance convergence rate. As an example, the low delta value can be set to 0.1 and the high delta value can be set to 0.3. Next, the size of a "safety buffer" is then determined by the computed reservation, the normalized performance, and a selected delta value (line 11). The resource limit value is then set to the sum of the reservation and the buffer size (line 12). The nonzero, adaptive buffer between limit and reservation allows the resource controller 514 to adjust runtime allocations if needed. In other implementations, the limit value can be set to one of the following: (1) the computed reservation, (2) the computed reservation plus some constant, and (3) the computed reservation plus the product of application performance and the computed reservation. Next, the limit is then compared against the available capacity and the minimum capacity requirement of the VM in order to ensure that the final value is feasible (line 13-17).

Turning back to FIG. 4, different application managers 410 are associated with certain RP managers 412 of the application resource allocation module 108. Specifically, the application managers that manage applications under the same RP are associated with the same RP manager. For each RP, the associated RP manager determines the allocation of resources to the applications running under this RP, based on the resources requested by the associated application managers, the available RP capacity, and RP settings. This is required because the application managers act independently of one another and may, in aggregate, request more resources than a particular RP has available.

As used herein, an RP is defined as modifiable if the RP-level resource settings can be modified by an administrator or through an API. This allows the resources to flow from low priority RPs to high priority RPs (e.g., from the RP 304-2 to the RP 304-1 in FIG. 3) within the same VDC. In addition, an RP is defined as expandable if the RP can automatically increase its own reservation, when it is exceeded by the sum of its children's reservations. If an RP has a reservation R, and VM, represents a virtual machine under this RP with a reservation $r_i$, then the RP has the following constraints:

| | Constraints |
|---|---|
| Expandable | $\forall r_i < R$ |
| Non-expandable | $\Sigma_i r_i \leq R$ |

The modifiability and the expandability of an RP will be referred to herein as resource properties of the RP.

For a resource where the total reservation requested is less than the RP-level reservation, the RP manager honors each associated application manager's requests. For a contested resource where the sum of VM-level reservations is greater than the RP-level reservation, the RP manager executes one of the following solutions:

(1) If the RP is expandable, the RP manager sets the VM-level resource values directly as request by the associated application managers, and the RP expands its reservation automatically to accommodate the total demand.

(2) If the RP is non-expandable but modifiable, the RP manger sets the RP-level reservation as the sum of the requested VM-level reservations.

(3) If the RP is non-expandable and unmodifiable, the RP manager throttles the VM-level reservations in proportion to the requested reservation for each VM.

In operation, each application manager sends the resource setting requests to the respective RP manager periodically. In an embodiment, each request is a 4-tuple of VM name, resource type, requested reservation and requested limit: (vmname; type; resv; limit). For each resource, the RP manager maintains a global vector (e.g., cpu_alloc_table), wherein each element in the vector is a 3-tuple of VM name, requested reservation, and allocated reservation: (vmname; req resv; alloc resv). This table is updated to keep track of each VM's request over time.

Figure 7:
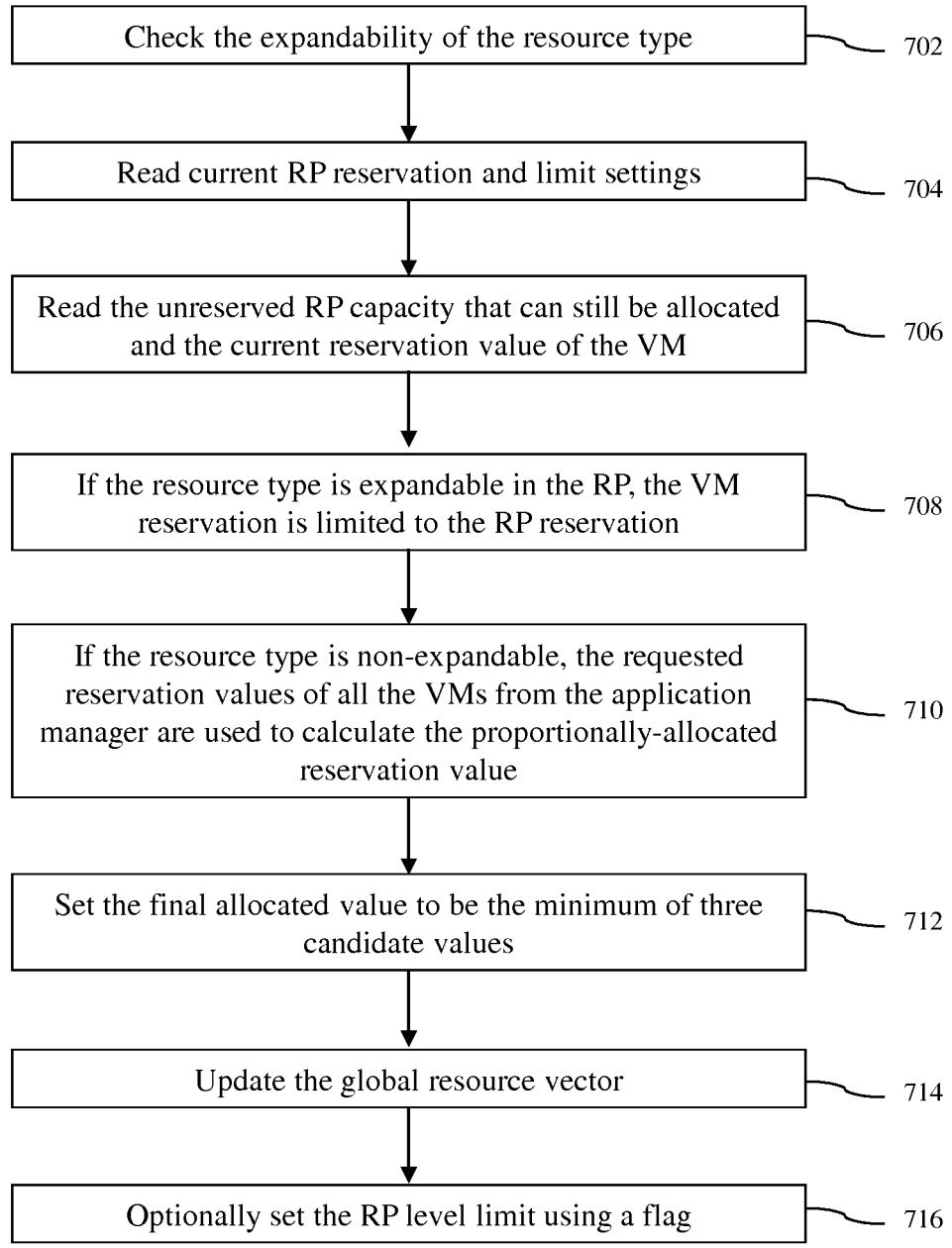
FIG. 7 is a flow diagram showing the operation of an RP manager of the application resource allocation module shown in FIG. 4 to calculate final VM-level and RP-level resource settings for each resource type in accordance with an embodiment of the invention.

Once a request is received from an application manager, the associated RP manager operates to calculate the actual or final VM-level and RP-level resource settings. The operation of the RP manager to calculate, for each VM under an RP, the final VM-level and RP-level resource settings for each resource type in accordance with an embodiment of the invention is described with reference to FIG. 7. At block 702, the expandability of the resource type is checked. At block 704, the current RP reservation setting and the current RP limit settings are read. At block 706, the unreserved RP capacity that can still be allocated and the current reservation value of the VM are read. At block 708, if this type of resource is expandable in the RP, the VM reservation is limited to the RP reservation to ensure that the constraint for expandable resource type is satisfied. At block 710, if the resource type is non-expandable, the requested reservation values of all the VMs from the application manager are used to calculate the proportionally-allocated reservation value for the VM. For example, for a non-expandable RP that has an RP level reservation of 1000 MHz, if the two VMs (vm1 and vm2) running under this RP each has a requested reservation value of 900 MHz and 300 MHz, respectively, then the proportionally-allocated reservation values for vm1 and vm2 should be 750 MHz and 250 MHz, respectively. At block 712, the final allocated value is set to be the minimum of three candidate values: 1) the proportionally-allocated reservation, 2) the unreserved RP capacity that can still be allocated plus the requested limit, and 3) the requested reservation. At block 714, the global resource vector table is updated. At optional block 716, the RP level limit is set optionally using a flag. For example, if the flag is true, then the RP level limit is set to be equal to the RP level reservation. Otherwise, the RP level limit is set to be unlimited.

In one particular implementation, each RP manager 412 executes the following algorithm for every resource setting request from one of the associated application managers 410 to calculate the actual VM-level and RP-level resource settings.

| Algorithm: VM and RP setting calculation |
|---|
| Input : application manager request tuple (vmname, type, resv, limit) |
| Output : VM and RP level setting tuple (vm_resv, vm_limit, rp_resv, rp_limit) |
| 1  isExpandable ← isExpandable (type); |
| 2  isModifiable ← isModifiable (type); |
| 3  curRpResv ← getRpReservationUsed (type); |
| 4  rpAvail ← getRpAvailReservation (type); |
| 5  rpCapacity ← curRpResv + rpAvail; |
| 6  curVmResv ← getVmReservation (vmname,type); |
| 7  if isExpandable or isModifiable then    /* Expandable and modifiable */ |
| 8  \| if resv > rpCapacity then vm_resv ← rpCapacity else vm_resv ← resv; |
| 9  else    /* Non-expandable and unmodifiable */ |
| 10  \| others_resv_req ← totalResvExceptVM (vmname); |
| 11  \| total_rp_resv_req ← others_resv_req + resv; |
| 12  \| prop_resv ← rpCapacity * resv/total_rp_resv_req; |
| 13  \| vm_resv ← min (prop_resv,rpAvail + curVmResv,resv); |
| 14  if limit < vm_resv then vm_limit ← vm_resv else vm_limit ← limit; |
| 15  rp_resv ← vm_resv + curRpResv − curVmResv; |
| 15  rp_limit ← rp_resv; |
| 16  updateTable (vmname, type, resv, vm_resv) |
| 18  return < vm_resv,vm_limit,rp_resv,rp_limit > |

In the above algorithm, the expandability and modifiability of the resource defined by type are first checked (line 1-2). The currently used and available RP reservation settings are then read and the total RP capacity is computed (line 3-5). Next, the requesting VM's current reservation value is retrieved (line 6). If the RP is expandable or modifiable, the VM reservation value is set directly (line 8). If the RP is non-expandable and unmodifiable, the global vector is scanned to get the total value of the requested reservations from all VMs in the resource pool and computes the proportionally-allocated value prop_resv for the requesting VM (line 10-12). The RP-level reservation and limit are then set and the global vector is updated with the new tuple (vname, type, resv, vm_resv) in the end (line 15-17).

Once the final VM-level and RP-level resource settings have been calculated, the RP manager 412 determines whether some or all of the final VM-level and RP-level resource settings should be set or applied. Depending on the expandability and modifiability settings of the RP, the RP manager can determine to apply the calculated values as follows:

1. Expandable: Only VM-level knobs (vm resv; vm limit) are set.
2. Non-expandable but modifiable:
   Case 1: both VM-level and RP-level knobs are set;
   Case 2: only RP-level reservations (rp resv) are set (if set_rp_limit=false);
   Case 3: only RP-level reservations and limits (rp resv; rp limit) are set (if set_rp_limit=true).
3. Non-expandable and unmodifiable: Only proportionally throttled VM-level knob values (vm resv; vm limit) are set.

The actuator 414 is configured to apply the final VM-level and RP-level resource settings and/or the RP-level resource settings, as determined by the RP managers 412, to the respective RPs and/or the VMs that belong to the RPs. In an embodiment, the final VM-level and RP-level resource settings and/or the RP-level resource settings may be set by the actuator through a vSphere™ Web Service API.

Figure 8:
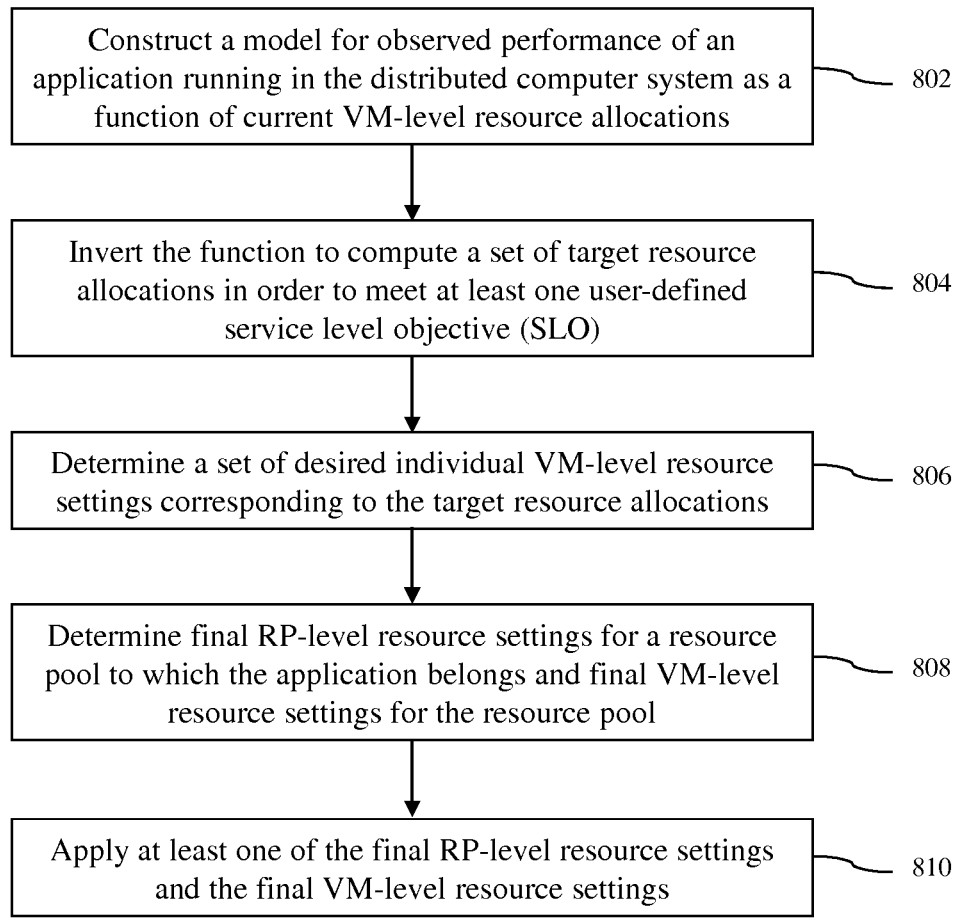
FIG. 8 is a flow diagram of a method for managing resources in a distributed computer system that includes at least one resource pool for a set of virtual machines in accordance with an embodiment of the invention.

A method for managing resources in a distributed computer system that includes at least one resource pool for a set of virtual machines in accordance with an embodiment of the invention is described with reference to a flow diagram of FIG. 8. At block 802, a model for observed performance of an application running in the distributed computer system as a function of current VM-level resource allocations is constructed. At block 804, the function is inverted to compute a set of target resource allocations in order to meet at least one user-defined service level objective (SLO). At block 806, a set of desired individual VM-level resource settings corresponding to the target resource allocations is determined. At block 808, final RP-level resource settings for a resource pool to which the application belongs and final VM-level resource settings for the resource pool are determined based on at least the set of desired individual VM-level resource settings, current RP-level resource settings of the resource pool and available resource capacity of the resource pool. At block 810, at least one of the final RP-level resource settings and the final VM-level resource settings is applied to at least one of the resource pool and virtual machines running under the resource pool based on at least one resource property of the resource pool.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing resources in a distributed computer system that includes at least one resource pool (RP) for a set of virtual machines (VMs), the method comprising:
   constructing a model for observed performance of an application running in the distributed computer system as a function of current VM-level resource allocations, wherein the model is a linear model that approximates a nonlinear relationship between VM-level resource allocations to the application and performance of the application;
   calculating an inverse function of the function to compute a set of target resource allocations in order to meet at least one user-defined service level objective (SLO);
   determining a set of desired individual VM-level resource settings corresponding to the target resource allocations;
   determining final RP-level resource settings for a resource pool to which the application belongs and final VM-level resource settings for the VMs running under the resource pool based on at least the set of desired individual VM-level resource settings, current RP-level resource settings of the resource pool and available resource capacity of the resource pool; and
   applying at least one of the final RP-level resource settings and the final VM-level resource settings to at least one of the resource pool and the VMs running under the resource pool based on at least one resource property of the resource pool.

2. The method of claim 1, wherein the calculating the inverse function of the function includes computing the target resource allocations in percentage units and wherein determining the set of desired individual VM-level resource settings includes determining the desired individual VM-level resource settings in absolute units of resources.

3. The method of claim 1, wherein the determining the set of desired individual VM-level resource settings corresponding to the target resource allocations includes adding a safety buffer to the target resource allocations.

4. The method of claim 3, wherein the determining the set of desired individual VM-level resource settings corresponding to the target resource allocations includes selecting a delta value based on the observed performance of the application and computing the safety buffer based on the selected delta value.

5. The method of claim 4, wherein the selecting the delta value includes selecting a lower delta value when the observed performance of the application is better than the user-defined service level objective and selecting a higher delta value when the observed performance of the application is worse than the user-defined service level objective.

6. The method of claim 5, wherein the determining the set of desired individual VM-level resource settings corresponding to the target resource allocations further includes calculating a resource limit value as a sum of a reservation value and the safety value.

7. The method of claim 1, wherein the determining the set of desired individual VM-level resource settings corresponding to the target resource allocations further includes calculating a resource reservation value by multiplying a target allocation value for a resource to the capacity for that resource.

8. The method of claim 1, wherein the applying at least one of the final RP-level resource settings and the final VM-level resource settings includes applying only the final VM-level resource settings if the resource pool is expandable.

9. The method of claim 1, wherein the applying at least one of the final RP-level resource settings and the final VM-level resource settings includes applying only the final VM-level resource settings that have been proportionally throttled if the resource pool is non-expandable and unmodifiable.

10. A non-transitory computer-readable storage medium containing program instructions for managing resources in a distributed computer system that includes at least one resource pool for a set of virtual machines (VMs), wherein execution of the program instructions by one or more processors causes the one or more processors to perform steps comprising:
constructing a model for observed performance of an application running in the distributed computer system as a function of current VM-level resource allocations, wherein the model is a linear model that approximates a nonlinear relationship between VM-level resource allocations to the application and performance of the application;
calculating an inverse function of the function to compute a set of target resource allocations in order to meet at least one user-defined service level objective (SLO);
determining a set of desired individual VM-level resource settings corresponding to the target resource allocations;
determining final RP-level resource settings for a resource pool to which the application belongs and final VM-level resource settings for the VMs running under the resource pool based on at least the set of desired individual VM-level resource settings, current RP-level resource settings of the resource pool and available resource capacity of the resource pool; and
applying at least one of the final RP-level resource settings and the final VM-level resource settings to at least one of the resource pool and the VMs running under the resource pool based on at least one resource property of the resource pool.

11. The non-transitory computer-readable storage medium of claim 10, wherein the calculating the inverse function of the function includes computing the target resource allocations in percentage units and wherein determining the set of desired individual VM-level resource settings includes determining the desired individual VM-level resource settings in absolute units of resources.

12. The non-transitory computer-readable storage medium of claim 10, wherein the determining the set of desired individual VM-level resource settings corresponding to the target resource allocations includes adding a safety buffer to the target resource allocations.

13. The non-transitory computer-readable storage medium of claim 12, wherein the determining the set of desired individual VM-level resource settings corresponding to the target resource allocations includes selecting a delta value based on the observed performance of the application and computing the safety buffer based on the selected delta value.

14. The non-transitory computer-readable storage medium of claim 13, wherein the selecting the delta value includes selecting a lower delta value when the observed performance of the application is better than the user-defined service level objective and selecting a higher delta value when the observed performance of the application is worse than the user-defined service level objective.

15. The non-transitory computer-readable storage medium of claim 14, wherein the determining the set of desired individual VM-level resource settings corresponding to the target resource allocations further includes calculating a resource limit value as a sum of a reservation value and the safety value.

16. The non-transitory computer-readable storage medium of claim 10, wherein the determining the set of desired individual VM-level resource settings corresponding to the target resource allocations further includes calculating a resource reservation value by multiplying a target allocation value for a resource to a capacity for that resource.

17. The non-transitory computer-readable storage medium of claim 10, wherein the applying at least one of the final RP-level resource settings and the final VM-level resource settings includes applying only the final VM-level resource settings if the resource pool is expandable.

18. The non-transitory computer-readable storage medium of claim 10, wherein the applying at least one of the final RP-level resource settings and the final VM-level resource settings includes applying only the final VM-level resource settings that have been proportionally throttled if the resource pool is non-expandable and unmodifiable.

19. An application resource allocation module for a distributed computer system that includes at least one resource pool for a set of virtual machines (VMs), the application resource allocation module comprising:
a memory;
at least one application manager operably coupled to an application running in the distributed computer system, the application manager including:
a model builder configured to construct a model for observed performance of the application as a function of current VM-level resource allocations, wherein the model is a linear model that approximates a nonlinear relationship between VM-level resource allocations to the application and performance of the application;
an application controller configured to calculate an inverse function of the function to compute a set of target resource allocations in order to meet at least one user-defined service level objective (SLO); and
a resource controller configured to determine a set of desired individual VM-level resource settings corresponding to the target resource allocations;
at least one resource pool manager operably coupled to the at least one application manager, the resource pool manager being configured to determine final RP-level resource settings for a resource pool to which the application belongs and final VM-level resource settings for the VMs running under the resource pool based on at least the set of desired individual VM-level resource settings, current RP-level resource settings of the resource pool and available resource capacity of the resource pool; and
an actuator operably coupled to the at least one resource pool manager, the actuator being configured to apply at least one of the final RP-level resource settings and the final VM-level resource settings to at least one of the resource pool and the VMs running under the resource pool based on at least one resource property of the resource pool.

20. The application resource allocation module of claim 19, wherein the application controller is configured to compute the target resource allocations In percentage units and wherein the resource controller is configured to determine the desired individual VM-level resource settings in absolute units of resources.

21. The application resource allocation module of claim 19, wherein the resource controller is configured to adding a safety buffer to the target resource allocations to determine the set of desired individual VM-level resource settings.

22. The application resource allocation module of claim 21, wherein the resource controller is further configured to select a delta value based on the observed performance of the application and compute the safety buffer based on the selected delta value.

23. The application resource allocation module of claim 22, wherein the resource controller is configured to select a lower delta value when the observed performance of the application is better than the user-defined service level objective and select a higher delta value when the observed performance of the application is worse than the user-defined service level objective.

24. The application resource allocation module of claim 23, wherein the resource controller is configured to calculate a resource limit value as a sum of a reservation value and the safety value.

25. The application resource allocation module of claim 19, wherein the resource controller is configured to calculate a resource reservation value by multiplying a target allocation value for a resource to the capacity for that resource.

26. The application resource allocation module of claim 19, wherein the resource controller is configured to let only the final VM-level resource settings be applied if the resource pool is expandable.

27. The application resource allocation module of claim 19, wherein the resource controller is configured to let only the final VM-level resource settings that have been proportionally throttled to be applied if the resource pool is nonexpandable and unmodifiable.

28. The method of claim 8, wherein the resource pool is expandable if the resource pool automatically increases a resource entitlement of the resource pool when the resource entitlement of the resource pool is exceeded by a sum of its children's resource entitlements.

* * * * *